United States Patent Office 3,458,621
Patented July 29, 1969

3,458,621
TABLET DOSAGE-FORM FOR THE IMMUNIZATION OF THE INTESTINAL TRACT WITH LIVE VIRUS PREPARATIONS
Howard Tint, Havertown, Pa., assignor to American Home Products Corporation, New York, N.Y., a corporation of Delaware
No Drawing. Filed Aug. 31, 1966, Ser. No. 576,247
Int. Cl. A61k 9/00, 27/00
U.S. Cl. 424—2    6 Claims The invention relates generally to virus-containing compositions intended for causing immunization upon administration. More particularly, the invention relates to an improved dosage-form for the immunization of the intestinal tract with live virus preparations, and to a method for preparing said dosage-form.

For many years it has been known that it is sometimes possible to protect against viral diseases by immunizing the individual via oral administration of the homologous virus, usually attenuated beyond the ability to cause clinical disease. The principle of immunization against poliomyelitis by the use of Sabin vaccine is a case in point.

However, contrary to the Sabin system, where the immunization route is comparable to the path of natural infection; it has also been known that one can immunize by infecting the intestinal tract with a virus which normally primarily affects other susceptible regions. Thus, adenovirus types will infect the small intestine as well as the respiratory tract, and a vaccination may be accomplished by by-passing the respiratory tract to liberate the virus in the small intestine and to produce an immunization thereby.

The principle referred to immediately above has been known for at least a number of years and, in fact, dosage-forms that would accomplish this purpose have already been prepared and used. These dosage-forms consisted of liquid or dried, viable adenovirus (several types) in capsules which were in turn enclosed in a second capsule, and the latter were eventually coated with the usual enteric preparations of the pharmaceutical art. A system has been described in a preliminary publication which appeared in the Annual Review of Respiratory Diseases, 83: 394–403. A system based upon an enteric capsule containing lyophilized virus is described in a later and more detailed publication which appeared in the Journal of the American Medical Association, 195: 45–459, 1963. As disclosed in said publications, preparation of the known dosage-forms has been limited to the gelatin encapsulation technique referred to therein.

Use of the foregoing technique had appeared, up to the time of the present invention, to be necessary to the only feasible dosage-forms for the demonstration of said immunization principle. However, said technique and the resulting dosage-forms have been found to have many inherent drawbacks and disadvantages. Most seriously, the known double-encapsulated dosage-forms have been found not to guard against the inadvertent release of live virus during the enteric coating operation, whereby the exterior surface of the enteric coat has been found to be contaminated. Thus, there are involved the dangers of loss of virus titers and, more importantly, the possibility of infection in the buccal cavity and/or the upper intestinal tract, thereby to risk direct infection in the upper respiratory areas, rather than to provide immunization at a remote site, according to the aforesaid principle. Although it might be possible to seal the capsules prior to coating, in order to avoid said dangers; this would involve an extremely laborious and time-consuming operation. A further serious disadvantage of said known dosage-forms is that the production thereof requires hand operation and does not lend itself readily to mass production. Thus, there is involved an over-riding difficulty of establishing automated equipment for large-scale production of the previously known "capsule-within-a-capsule" forms.

The present invention is based on my discovery of a novel, improved dosage-form that is particularly adapted for the immunization of the intestinal tract with live virus preparations, and which does not have the inherent drawbacks and disadvantages of the known dosage-forms as referred to herebefore.

In its broadest composition aspect, the improved dosage-form of the present invention comprises: an inner pressed tablet containing at least one pharmaceutically-acceptable solid excipient and a live virus capable of infecting the intestinal tract; an intermediate pressed layer containing at least one pharmaceutically acceptable solid excipient, said intermediate layer completely encasing said inner pressed tablet and providing a shell which per se has a minimum wall thickness of 0.03 inch; and an outer enteric coating material completely covering said intermediate pressed layer. In its broadest process aspect, the method of the present invention comprises: mixing a batch of live virus with a batch of at least one pharmaceuticaly acceptable solid excipient; compressing the resultant mixture into coherent tablets; again providing a batch of at least one pharmaceutically acceptable excipient; compressing material from said batch about said coherent tablets in an encasing layer to form a shell hving a wall thickness of at least 0.03 inch; and the completely covering the resulting larger tablets with an enteric coating. The inner part, or core, of the described dosage-form may be either a compressed tablet of lyophilized material or a compressed tablet of solid material containing adsorbed liquid virus which, as a whole, is capable of compression. The latter includes semi-dry material obtained by adsorbing virus-containing fluids on sugar or resins, for example.

Amongst the inherent advantages stemming from the exercising of the present invention are the following: The interposition of an inert press-coat (outer layer) around the active core (inner tablet) provides a barrier against the inadvertent release of live virus during the enteric coating operation, which might contaminate the exterior surface of the enteric coat. That is, the inert press-coat surrounding the active core provides a physical barrier to the acidental loss of virus-containing fragments from the core in the process of applying the enteric coat, thereby insuring against accidental contamination of the buccal surfaces and upper-respiratory tract during administration.

In this connection, the viruses referred to can be acid labile, and the enteric coating of the press-coated nucleus further assures that the virus gets through the stomach without loss of titer. As also referred to previously, the double capsule of the prior art provides no guarantee in this regard, as has unfortunately already been demonstrated by actual experience. The press-coat (outer layer) around the active core (inner tablet) in accordance with the invention prevents any deleterious effect upon the virus titers which might result from the solvents which are normally used for applying enteric coats. The protection of the press-coat serves to preserve the integrity of the core during the actual administration by the oral route and against damage from instruments, teeth and the like. Finally, whereas the known encapsulated dosage-forms require hand-operation and do not lend themselves readily to mass production, as referred to hereinbefore; the enteric-covered press-coated table of the invention may be made easily with available equipment, on a mass scale.

The successful production of an oral dosage-form, in accordance with the invention, is particularly surprising in consideration of the pre-existing theoretical prejudices which arise from the otherwise popular supposition that there would be significant heat destruction of the virus during the double pressing of the tablet form. Surprisingly, this has been found not to occur.

The following example illustrates the press-coated tablet dosage-form of the invention, and mode of preparation, in greater detail.

EXAMPLE

I. Preparation of lyophilized virus

A. 6,000 ml. of a lot of adenovirus type IV, identified as OPL No. 10, were filtered in accordance with standard procedures.

B. The following additives were then admixed into the filtered lot:

| Component: | Amount, ml. |
|---|---|
| (1) 20 percent skim milk autoclaved at 10 lb. for 10 min. | 1,500 |
| (2) 5 percent gelatin USP, autoclaved at 15 lb. for 15 min. | 120 |
| (3) 5 percent human serum albumin | 72 |

C. The resultant virus-containing mixture was then subjected to lyophilization by the known tray-dried techniques to give 344 gm. total weight lyophilized material. Thus, 1 ml. of the original virus field was present in each 57.3 mg. of lyophilized material.

II. Preparation of dosage-form lots

A. Blending prior to compression.—334.25 gm. of lyophilized solids obtained in I.C. above, and representing 5833 cc. original adenovirus type IV fluid, were blended with a mixture containing 350 gm. of microcrystalline cellulose, 4.4 gm. magnesium stearate and 885.4 gm. lactose.

B. Initial compression.—459 gm. of the mixture obtained in A immediately above were compressed in standard tableting apparatus to yield 5100 tablets, each weighing 90 mg. and having cylindrical dimensions equivalent to 0.250 inch diameter and 0.113 inch high. (Each tablet contained 19.1 mg. of lyophilized solid, or the equivalent of one-third cc. of the original fluid.)

C. Second compression.—Of the 5100 tablets obtained in B above, 2500 tablets were subsequently press-coated by compressing about each tablet a mixture comprising 288.7 mg. of lactose, 0.9 mg. magnesium stearate, and 72.4 mg. microcrystalline cellulose to yield 2500 press-coated (or "tablet within a tablet") tablets, each weighing 452 mg. and having cylindrical dimensions equivalent to 0.375 inch in diameter and 0.212 inch high.

D. Enteric coating.—(1) An enteric coating solution was prepared by admixing a batch having the following composition:

| Component: | Percent |
|---|---|
| Cellulose acetate hydrogen phthalate | 10 |
| Castor oil | 0.25 |
| Acetone | 44.75 |
| Absolute ethanol | 45 |

(2)(a) The 2600 non-press-coated tablets were coated by using conventional pan coating techniques which comprised keeping the tablets dipped in the coating composition for two hours at room temperatures. Each tablet was particular virus which is first lyophilized or otherwise coated with approximately 25 mg. (dried weight) enteric coating material.

(b) The 2500 press-coated tablets were similarly coated by using the same conventional pan coating techniques utilized in (2)(a) above. Each of these tablets were coated with approximately 25 mg. (dried weight) enteric coating material.

E. Storage.—Prior to use, the tablets were stored at 5° C.

F. Testing.—(1) Following the in vitro disintegration procedures as described in the U.S.P. XVI, both the enteric coated non-press-coated tablets obtained in D (2)(a) above and the enteric coated press-coated tablets obtained in D (2)(b) above withstood artificial gastric juice for a minimum of four hours at 37° C., yet disintegrated in simulated intestinal fluid at 37° C. within 25 minutes. Thus, it was demonstrated that the dosage-form of the invention (and its inherent advantages with respect to undesirable virus migration or escape) is obtained without sacrifice of its ultimate function in the gut.

(2) The superior results in antibodies titer obtained with the use of the press-coated dosage form of the invention was demonstrated by a comparison of serologic data as given in the table below:

TABLE.—NEUTRALIZING ANTIBODY RESPONSES FOLLOWING ADMINISTRATION OF LIVE TYPE 4 ADENOVIRUS CONTAINED IN ENTERIC COATED TABLETS

| Type tablet | Initial neutralizing antibody titer | No. men | No. with 4-fold rise in neutralizing antibody | | Geometric mean titer | |
|---|---|---|---|---|---|---|
| | | | 11 days | 15 days | 11 days | 15 days |
| Press | <4 | 13 | 13(100) | 13(100) | 19.8 | 115.4 |
| Coated | 4or> | 11 | 4(36) | 7(64) | 16.0 | 141.1 |
| Non-press | <4 | 20 | 10(50) | 14(70) | 10.6 | 26.2 |
| Coated | 4or> | 4 | 1(25) | 1(25) | 32 | >256 |

Note.—Values in parentheses are percentages.

As can be seen from the foregoing, the dosage form of the invention successfully elicited an antibody response in the antibody-negative individuals to which it was given, and resulted in an appreciably greater magnitude of titer rise; whereas the non-press-coated tablets not only failed to elicit an antibody response in all the antibody-negative individuals, but, in addition, the magnitude of the titer rise was significantly smaller.

G. Use in immunization.—The tablets were administered orally to persons susceptible to infection by adenovirus. Immunity from such infection for a six week observation period was obtained. Moreover, examination of so-immunized persons revealed no detectable shedding of the adenovirus from the upper respiratory areas. On the other hand, virus was shed from the intestine, indicating that the infection at that remote site had occurred.

While a preferred embodiment of the novel dosage-form of the invention and its mode of preparation have been disclosed for purposes of illustration, it will be evident to those skilled in the art that various changes and modifications may be made therein without departing from the scope and spirit of the invention. Merely by way of example, it will appear at once that the virus which can be incorporated in the press-coated tablets of the invention may be influenza, parainfluenza, rhinoviruses and other viruses whose primary infection site is not the intestine. Excipients known to the art, other than those of the example may be substituted in whole or in part, as may also be the enteric coating composition. The tablet dimensions (both inner and outer) may be varied according to circumstances. Further, with the efficacy of the intestinal infection for vaccination for a given virus being established; the administration of the virus to infants, or others for which oral administration may be a problem, may be by way of a suppository. In such case, the enteric coating might be omitted. As will also be understood, the processed prior to being incorporated ultimately into the dosage-form of invention; may be pepared and/or incubated by conventional procedures known in the art.

I claim:

1. A live virus enteric coated compressed tablet dosage-form with a safety feature for the immunization of the intestinal tract with live virus preparations, said dosage-form insuring against accidental contamination of the outer enteric coating during manufacture and of the upper respiratory tract and buccal surface during administration comprising: an inner pressed tablet containing at least one pharmaceutically-acceptable solid excipient and a live virus capable of infecting the intestinal tract whose primary infection site is not the intestine and may be the upper respiratory tract; an intermediate pressed layer containing at least one pharmaceutically-acceptable solid excipient, said intermediate layer completely encasing said inner pressed tablet and providing a safety shell which per se has a minimum wall thickness of 0.03 inch providing a physical barrier to the accidental loss of virus-containing fragments from the core in the process of applying the enteric coat thereby insuring against accidental contamination of the buccal surface and upper respiratory tract during administration; and an outer enteric coating material completely covering said intermediate pressed layer.

2. A dosage-form as claimed in claim 1 wherein said live virus is an adenovirus.

3. A dosage-form as claimed in claim 1 wherein said inner pressed tablet and said intermediate pressed layer each contain a plurality of pharmaceutically-acceptable solid excipients.

4. A dosage-form as claimed in claim 3 wherein said plurality, of pharmaceutically-acceptable excipients, consists essentially of microcrystalline cellulose, magnesium stearate and lactose.

5. A dosage-form as claimed in claim 4 wherein said live virus is a lyophilized adenovirus and said shell has a wall thickness of about 0.05 inch.

6. A dosage-form as claimed in claim 5 wherein said enteric coating material comprises cellulose acetate hydrogen phthalate, castor oil, acetone, and absolute ethanol.

References Cited

UNITED STATES PATENTS 3,317,393  5/1967  Chanock et al. _____ 424—93

LEWIS GOTTS, Primary Examiner

S. K. ROSE, Assistant Examiner.

U.S. Cl. X.R.

424—14, 16, 21, 35, 89

PO-1050
(5/69)

UNITED STATES PATENT OFFICE
CERTIFICATE OF CORRECTION

Patent No. 3,458,621          Dated September 3, 1969

Inventor(s)   Howard Tint

It is certified that error appears in the above-identified patent and that said Letters Patent are hereby corrected as shown below:

In column 2, line 28, after "and", the word "the" should read --then--.

In column 3, line 75, the entire phrase "particular virus which is first lyophilized or otherwise" should not appear at all.

In column 4, line 1, "25 mg." should read --6 mg.--;
lines 29-31, in the Table, the portion thereof appearing under the heading "Type tablet" which appears as:

"Press ----------
Coated ---------
Non-Press ------
Coated ---------"

should read

--Press
Coated ---------{

Non-Press
Coated ---------{--

SIGNED AND
SEALED
APR 28 1970

(SEAL)
Attest:

Edward M. Fletcher, Jr.
Attesting Officer

WILLIAM E. SCHUYLER, JR.
Commissioner of Patents